SYNCHRONIZING SIGNAL SEPARATOR AND KEYED AUTOMATIC GAIN CONTROL

Filed Sept. 28, 1946 2 Sheets-Sheet 1

Inventor
George W. Fyler
By Mueller and Mason
Attorneys

Sept. 4, 1951 G. W. FYLER 2,566,763

SYNCHRONIZING SIGNAL SEPARATOR AND KEYED AUTOMATIC GAIN CONTROL

Filed Sept. 28, 1946 2 Sheets-Sheet 2

Inventor
George W. Fyler
By
Mueller and Mason
Attorneys

Patented Sept. 4, 1951

2,566,763

UNITED STATES PATENT OFFICE 2,566,763

SYNCHRONIZING SIGNAL SEPARATOR AND KEYED AUTOMATIC GAIN CONTROL

George W. Fyler, Lombard, Ill., assignor to Motorola, Inc., a corporation of Illinois Application September 28, 1946, Serial No. 700,137

2 Claims. (Cl. 178—7.5)

Figure 1:
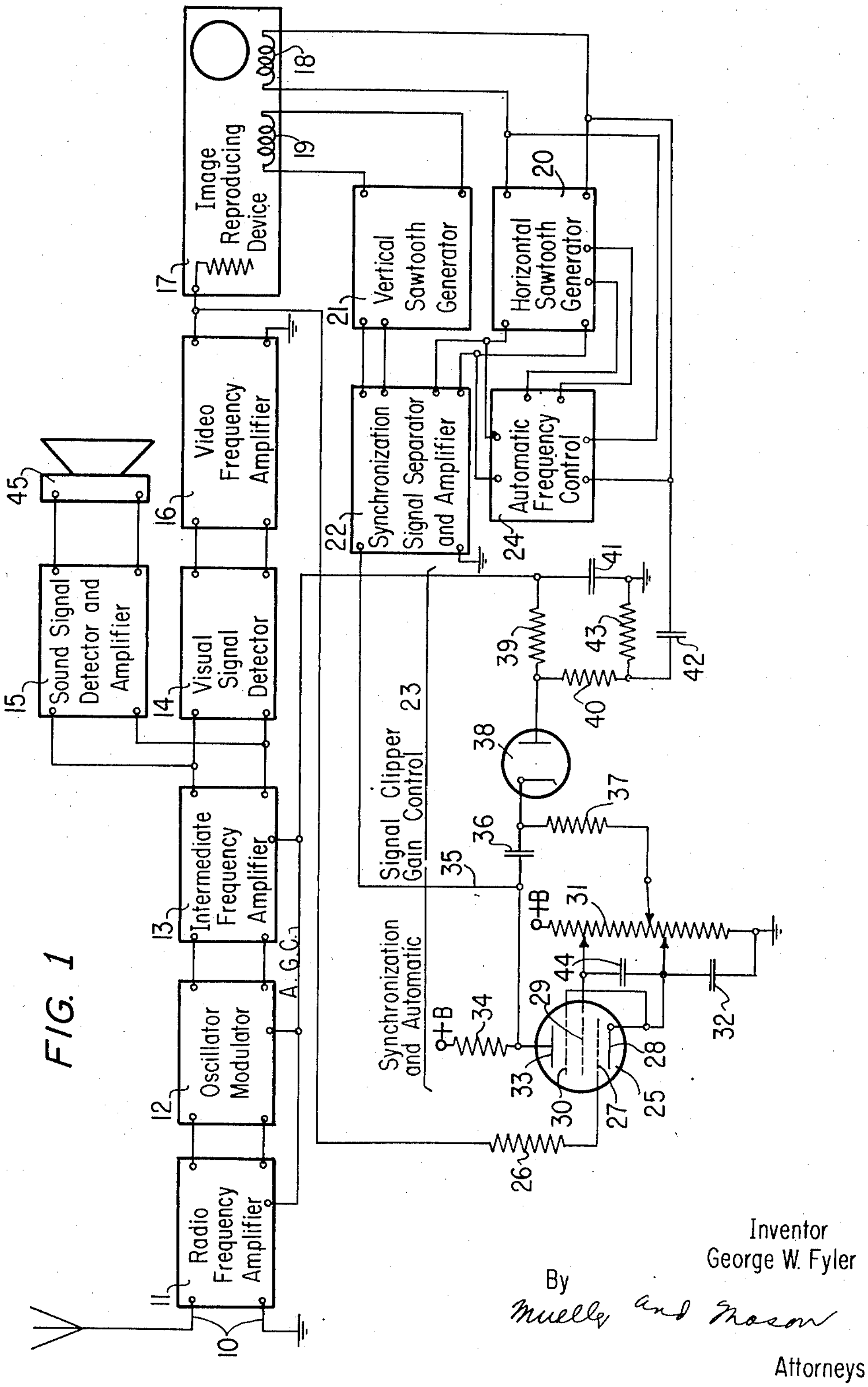

This invention relates generally to television systems and in particular to an improved circuit for separating the synchronization pulses from a composite video signal and for deriving an automatic gain control voltage therefrom.

In television receiving systems an automatic gain control system is desirable to prevent both slow and fast fading and to facilitate station switching. In prior art television systems, circuits have been used in which the peak amplitude of the synchronization pulses are used to provide voltages which are a measure of the signal strength. Difficulty has been experienced in these systems in that the gain control potential is effected greatly by noise pulses which appear superimposed on the synchronization pulses and because of high amplitude impulse noise, and the voltage obtained is not a true measure of the amplitude of the synchronization pulses.

It is, therefore, an object of the present invention to provide an improved method for obtaining the synchronization pulses from a composite video signal.

It is an additional object of this invention to provide a synchronization signal clipper for a television receiver which is not subject to disablement from impulse noises and which is free from jitter caused by hiss noises.

It is a further object of this invention to provide a system for obtaining an automatic gain control voltage from the synchronization pulses which is proportional to the average amplitude thereof and which is not substantially effected by noise pulses.

A still further object of this invention is to provide an automatic gain control system for a television receiver which will be effective to hold the video signal within such close limits that front-of-panel controls for regulating the brightness and contrast of the television image are not necessary.

A feature of this invention is the provision of a synchronization signal clipper including a pentode to which the composite video signal is directly applied and which produces synchronization pulses having an amplitude corresponding to the amplitude of the received video signal.

A further feature of this invention is the provision of a system for obtaining synchronization pulses from a composite video signal which are a measure of the signal strength, and averaging the values of the pulses to provide an automatic gain control voltage.

A still further feature of this invention is the provision of a circuit for deriving an automatic gain control voltage from synchronization pulses including means for delaying the action of the gain control and for time selection of the desired pulses to eliminate the noise pulses occurring between the desired pulses.

Further objects, features and advantages will be apparent from the following description taken in connection with the accompanying drawing which illustrates a television receiver in accordance with the invention with the standard components shown in block diagram and the improvide clipper and automatic gain control system shown in detail.

In practicing my invention I provide a television receiver in which the video signal is detected and amplified in any standard manner and in which the composite video signal is applied directly to an image reproducing device and also to a synchronization signal clipper. A pentode tube is utilized in the clipper, the composite video signal being applied to the grid thereof with a fixed bias so that all values above a particular signal value, determined by said fixed bias, are conducted thereby. The bias is adjusted so that only values somewhat above the black level are passed by the pentode so that only part of the synchronization pulses are passed. These pulses are applied to a synchronization signal separator and amplifier for controlling vertical and horizontal sawtooth generators. The pulses are also applied through a differentiating network to a rectifier which is gated by the horizontal scanning voltages produced by the horizontal sawtooth generator. This gating provides time selection of the pulses resulting in noise reduction. The rectifier produces a voltage proportional to the average value of the synchronization pulses, this voltage being applied to one or more of the stages of the television receiver to control the gain thereof.

Figure 2:
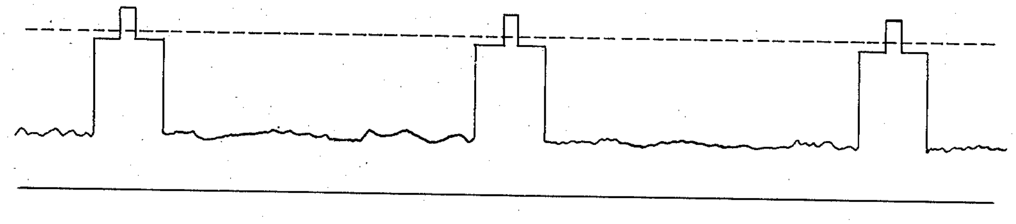
Figure 3:
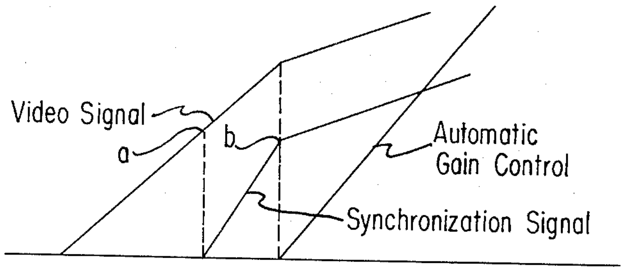
Figure 4:
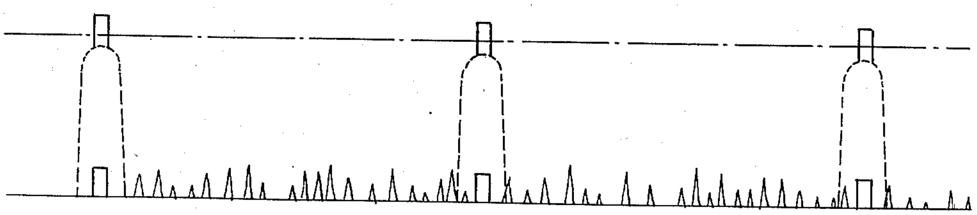

For a better understanding of the present invention reference may be had to the accompanying drawings in which:

Fig. 1 is a circuit diagram partially in block form illustrating an embodiment of the present invention, and Figs. 2, 3 and 4 are curve diagrams in order to aid in understanding the operation of the arrangement disclosed in Fig. 1.

Referring now to the drawings, there is illustrated a receiver of the superheterodyne type including an antenna system 10 for intercepting incoming signals and applying them to a radio frequency amplifier 11. The signals are amplified therein and then converted into intermediate frequency signals by oscillator-modulator 12. The signals are further selected and amplified in intermediate frequency amplifier 13 from which they are applied to visual-signal detector 14 and sound signal detector and amplifier 15. The picture signal is derived in the detector 14 and is amplified by video frequency amplifier 16 and then applied to the control grid of image reproducing device 17. For the purpose of deflecting the beam of the image reproducing device, horizontal and vertical deflecting coils 18 and 19 are provided which cause the scanning beam to scan the fluorescent screen of the device 17 in a predetermined manner. The deflecting coils 18 and 19 are connected respectively to a horizontal sawtooth generator 20 and a vertical sawtooth generator 21 each of which supplies currents of sawtooth wave form to the deflecting coils. Pulses for controlling the sawtooth generators are provided by synchronization signal separator and amplifier 22. An automatic frequency control circuit 24 is provided for holding the horizontal sawtooth generator 20 in step with the synchronization pulses. Synchronization signals are applied to the synchronization signal separator by the synchronization signal clipper 23 which also provides an automatic gain control voltage which may be applied to one or more of the tubes of radio frequency amplifier 11, oscillator-modulator 12 and intermediate frequency amplifier 13 in a manner to be explained. The sound signal detector and amplifier 15 provides an audio frequency output for driving sound reproducing device 45. All of the units described with the exception of the synchronization signal clipper 23 may be of well known construction and accordingly a detailed illustration and description thereof is not given here. The operation of the synchronization signal clipper 23 and the means for providing automatic gain control therefrom will be described in detail in the following paragraph.

Referring now more particularly to the synchronization signal clipper 23, it is seen that the composite video signal is fed from the video signal amplifier to the pentode tube 25 of the synchronization signal clipper through biasing resistor 26 which is connected to the grid 27 of the pentode. Operating potentials are applied to the cathode 28, screen grid 29, and suppressor grid 30 of the pentode through voltage divider 31 which is connected to a source of voltage indicated as +B. The plate 33 of the pentode is also connected to the +B voltage through resistor 34. To provide a path for high frequency currents from the cathode 28 to ground, capacitor 32 is bridged across that portion of the voltage divider which is connected to the cathode. Similarly the screen is bypassed to the cathode by condenser 44. The resistor 26 provides regulation for improving the noise limiting action of grid 27 for reducing impulse noise peaks. The potentials applied to the pentode 25 are such that this tube will conduct on synchronization pulses somewhat above the "black" level only after a predetermined voltage is provided by the video signal amplifier, thus providing delayed action of the automatic gain control rectifier 38. The synchronization pulses are applied through conductor 35 to the synchronization signal separator and amplifier 22 wherein the horizontal and vertical pulses are separated and amplified and applied to the horizontal and vertical sawtooth generators 20 and 21 for controlling the scanning currents produced thereby.

The synchronization signals are also applied through a differentiating network composed of capacitor 36 and resistor 37 to diode 38. The delayed action of the automatic gain control is further controlled by varying the voltage applied to resistor 37 by adjusting the position of the contact from the resistor to the voltage divider 31. These delaying actions provide first an adequate synchronization pulse amplitude and then for any further increase the rectifier 38 develops automatic gain control voltage. The diode feeds into an output circuit composed of resistors 39, 40 and 43 and capacitor 41 to produce a voltage across capacitor 41 which corresponds to the average value of the synchronization pulses. A gating potential is applied to the plate of the diode through capacitor 42 which is connected to the horizontal deflecting coil 18. This provides sufficient potential for the diode to conduct only during the horizontal synchronization pulses thereby to provide time selection of the pulses rectified and reduce impulse noise interference. This automatic gain control voltage is applied to radio frequency amplifier 11, oscillator-modulator 12 and intermediate frequency amplifier 13 to control the gain thereof.

As the synchronization pulses produced by the pentode 25 are obtained by cutting off a fixed amount of the amplitude of the synchronization signals, the pulses produced are a measure of the amplitude of the signals. Fig. 2 illustrates this action with the solid line representing the composite video signal and the dotted line indicating the fixed amplitude cut off. It is noted that the cut off is above the shoulder on the synchronization pulse which is the "black" level. This is to be contrasted with a system wherein A. C. coupling and peak detection are used as in this arrangement the clipper biases itself in accordance with the peak value of the signal and as noise potentials will be superimposed on the synchronization signal the clipper will be biased by such noise potentials, sometimes for many lines in the picture. Furthermore, the magnitude of the clipped synchronization signal will not be a true measure of the strength of the composite signal. Although some noise is transmitted in the present system, the hiss noise appears only upon the synchronization signal and does not cause jitter in the leading edge of the synchronization pulse. The amount of the synchronization signal transmitted is not caused to fluctuate in amplitude by the hiss noise voltages present as in the peak detection system inherent in the ordinary alternating current coupled clipper. The noise potentials are normally of very short duration and have little effect on the over-all voltage produced by the diode 38 for automatic gain control since the automatic gain control voltage depends upon the average value of the synchronization pulses. The use of time selection in the detector system further reduces the effect of impulse noise potentials on the automatic gain control as it allows the diode to conduct only when synchronous horizontal pulses are applied thereto. The operation of the time gate will be further described.

In order for a system as above described to be satisfactory, the gain of the system must be accurately controlled so that the amplitude of the synchronization signals will be substantially constant and of such magnitude to cause the tube 25 to conduct. The provision of the delay network permits the action of the automatic gain control system to be governed to thereby produce the necessary control. The operation of the automatic gain control system is shown in Fig. 3.

The video signal must increase to a predetermined level before any synchronization pulses appear on the clipper. This level is indicated at point *a* on the video signal curve. The synchronization signal must also rise to a predetermined level before automatic gain control voltage is produced. This is indicated at point *b* on the synchronization signal wave. The application of the automatic gain control voltage to the receiver system causes the gain of the video and synchronization signals to level off somewhat as is shown in the chart. Thus the automatic gain control holds the signals within limits so that a fixed bias clipper can be used, and the clipper produces synchronization pulses which are a measure of the signal strength and which can be used for obtaining an automatic gain control voltage. Accordingly, the two features mutually cooperate to provide an improved result.

The operation of the time gate is illustrated in Fig. 4. The signals applied to the diode from the clipper include synchronization pulses and noise pulses as shown in solid lines. The bias applied to the diode 38 from the voltage divider 31 (dot-dash line) is such that the pulses from the clipper will not in themselves cause the diode to conduct. The horizontal pulses applied to the diode from the horizontal sawtooth generator through condenser 42 will provide a positive bias for the tube during these pulses as shown in dotted lines. These pulses, together with the pulses from the clipper, will cause the diode to conduct to provide an automatic gain control voltage. In order that the horizontal pulses are centered with respect to the synchronization pulses shown in Fig. 4, an automatic frequency control circuit 24 is required. Pulses are applied to this circuit from the horizontal sawtooth generator 20 and the synchronization signal separator and amplifier 22 and produces voltages for holding the horizontal sawtooth generator in step with the synchronization pulses. Such circuits are well known in the art and accordingly will not be described in detail. As the pulses from the generator occur only about 10% of the time, it is seen that about 90% of the noise pulses will be eliminated and accordingly noise will have a very small effect on the automatic gain control voltages.

The synchronization signal clipper and automatic gain control system in accordance with the invention have been utilized in television receivers and have been found to be very effective in the presence of slow fading and also fast fading such as flutter caused by re-radiation of signals from airplanes. The gain control has been so complete that both the brightness control and the contrast control normally provided on the control panel of a television receiver may be eliminated. That is, the intensity of the video signal voltage is held within such limits that a picture of the desired brightness is provided at all times without the use an auxiliary control therefor. Also the action of the automatic gain control is sufficiently uniform at various signal intensities that the contrast of the picture remains at the desired level without the use of an auxiliary control.

Although I have described what I consider to be the preferred embodiment of my invention, it is apparent that various changes and modifications can be made therein without departing from the intended scope of the invention as defined in the appended claims.

I claim:

1. A system for providing synchronization pulses and automatic gain control for a television receiver which includes an image reproducing device, means for receiving and amplifying a composite video signal including picture elements and horizontal and vertical synchronization elements all of which have an amplitude greater than the amplitude of said picture elements, and means for applying said amplified composite video signal having a direct current component to said image reproducing device, said system including in combination, a clipper circuit including an electron discharge valve having a cathode, a control grid and an anode, direct current coupling means for applying the amplified composite video signal to said control grid as a positive going signal having a direct current component, said clipper circuit including means for applying potentials to said cathode and said anode of said valve so that current flows in said anode only when the amplitude of said composite video signal exceeds a predetermined value, a rectifier circuit including a diode having a cathode and an anode, a capacitor connecting said cathode of said diode to said anode of said valve, means connected to said cathode and said anode of said diode for holding said cathode positive with respect to said anode so that said diode is normally non-conducting, means for applying positive pulses to said anode of said diode during said horizontal synchronization elements, with said pulses having a value less than the positive bias of said cathode so that said diode is rendered conductive by a pulse only when a given current flows in said valve to thereby reduce the potential of said cathode of said diode, condenser means connected to said anode of said diode and charged by current flowing therethrough to provide a gain control voltage which varies with the amplitude of said composite video signal for all values above a particular value, and means for applying said gain control voltage to said means for receiving and amplifying said video signal for controlling the gain thereof so that said composite video signal applied to said valve has such an amplitude that said picture elements fall below said predetermined value and said synchronization elements exceed said predetermined value and appear at said anode of said valve.

2. A system for providing synchronization pulses and an automatic gain control voltage for a television receiver which includes an image reproducing device, means for receiving and amplifying a composite video signal including picture elements and horizontal and vertical synchronization elements all of which have an amplitude greater than the amplitude of said picture elements, and means for applying said amplified composite video signal to said image reproducing device, said system including in combination, a clipper circuit including an electron discharge valve having a cathode, a control grid and an anode, direct current coupling means for applying a positive going composite video signal having a direct current component to said control grid, said clipper circuit including means for applying potentials to said cathode and said anode of said valve so that current flows in said anode when the amplitude of said composite video signal exceeds a predetermined value to provide a voltage drop at said anode, rectifier means including a cathode and an anode, a capacitor coupling said cathode of said rectifier means to said anode of said valve, means connected to said cathode of said rectifier means for applying a positive potential thereto, resistance means connecting said anode of said rectifier means to ground, means connected to said resistance means for applying positive pulses having a value less that said positive potential to said anode of said rectifier means during said horizontal synchronization elements, a circuit including condenser means connected between said anode of said rectifier means and ground, said rectifier means being conductive in response to simultaneous occurrence of said voltage drop at said anode of said valve and said voltage pulse at said anode of said rectifier means to provide a gain control voltage across said condenser means which varies with the amplitude of said composite video signals for all amplitudes above a particular value, and means for applying said gain control voltage to said means for receiving and amplifying said video signal for controlling the gain thereof so that said composite video signal applied to said valve has such an amplitude that said picture elements are below said predetermined value and said synchronization elements exceed said predetermined value and appear at said anode of said electron discharge valve.

GEORGE W. FYLER.

REFERENCES CITED

The following references are of record in the file of this patent:

UNITED STATES PATENTS

| Number | Name | Date |
|---|---|---|
| 2,178,766 | Tolson | Nov. 7, 1939 |
| 2,197,900 | Schlesinger | Apr. 23, 1940 |
| 2,217,948 | Harnett et al. | Oct. 15, 1940 |
| 2,240,507 | Lewis | May 6, 1941 |
| 2,240,605 | Bingley | May 6, 1941 |
| 2,248,772 | Messner | July 8, 1941 |
| 2,260,963 | Wilder | Oct. 28, 1941 |
| 2,289,948 | Wilson | July 14, 1942 |
| 2,294,341 | Moore | Aug. 25, 1942 |
| 2,295,346 | Jones et al. | Sept. 8, 1942 |
| 2,300,942 | Lewis | Nov. 3, 1942 |
| 2,303,184 | Wheeler | Nov. 24, 1942 |
| 2,307,375 | Blumlein et al. | Jan. 5, 1943 |
| 2,332,681 | Wendt | Oct. 26, 1943 |
| 2,356,140 | Applegarth, Jr. | Aug. 22, 1944 |
| 2,356,141 | Applegarth | Aug. 22, 1944 |

FOREIGN PATENTS

| Number | Country | Date |
|---|---|---|
| 457,532 | Great Britain | Nov. 30, 1936 |
| 832,533 | France | Sept. 28, 1938 |
| 49,220 | France<br>1st. addition to 832,533 | Dec. 7, 1938 |
| 845,897 | France | Sept. 4, 1939 |